(12) United States Patent
Boutaghou et al.

(10) Patent No.: US 7,123,448 B1
(45) Date of Patent: Oct. 17, 2006

(54) EXTENDED ALUMINA BASECOAT ADVANCED AIR BEARING SLIDER

(75) Inventors: Zine-Eddine Boutaghou, Vadnais Heights, MN (US); Jason W. Riddering, Prior Lake, MN (US); Anthony P. Sannino, Longmont, CO (US)

(73) Assignee: Seagate Technology, LLC, Scotts Valley, CA (US)

( * ) Notice: Subject to any disclaimer, the term of this patent is extended or adjusted under 35 U.S.C. 154(b) by 210 days.

(21) Appl. No.: 09/884,796

(22) Filed: Jun. 19, 2001

Related U.S. Application Data

(60) Provisional application No. 60/239,990, filed on Oct. 13, 2000.

(51) Int. Cl.
G11B 5/60 (2006.01)

(52) U.S. Cl. ............... 360/235.3; 360/235.7

(58) Field of Classification Search ......... 360/234.3, 360/234.6, 234.7, 235.1, 235.2, 235.3, 235.4, 360/235.5, 235.6, 235.7, 235.8, 235.9, 236.4, 360/236.5, 237.1
See application file for complete search history.

(56) References Cited

U.S. PATENT DOCUMENTS

| | | | | |
|---|---|---|---|---|
| 4,910,621 A * | 3/1990 | Matsuda et al. | ......... | 360/235.1 |
| 5,276,573 A * | 1/1994 | Harada et al. | ......... | 360/235.3 |
| 5,468,177 A | 11/1995 | Kindler et al. | ......... | 451/364 |
| 5,473,486 A * | 12/1995 | Nepela et al. | ......... | 360/234.7 |
| 5,559,051 A * | 9/1996 | Voldman et al. | ......... | 438/3 |
| 5,721,650 A | 2/1998 | Crane et al. | ......... | 360/103 |
| 5,751,515 A * | 5/1998 | Kasahara | ......... | 451/5 |
| 5,764,832 A * | 6/1998 | Tabuchi | ......... | 385/49 |
| 5,801,084 A * | 9/1998 | Beasom et al. | ......... | 360/234.6 |
| 5,880,840 A | 3/1999 | Li | ......... | 356/357 |
| 5,886,856 A * | 3/1999 | Tokuyama et al. | ......... | 360/234.7 |
| 5,936,806 A * | 8/1999 | Pan et al. | ......... | 29/603.14 |
| 5,985,163 A | 11/1999 | Cha et al. | ......... | 216/22 |
| 5,995,324 A | 11/1999 | Haddock et al. | ......... | 360/103 |
| 6,191,923 B1 | 2/2001 | Tokuyama et al. | ......... | 360/236.6 |
| 6,219,200 B1 * | 4/2001 | Waki et al. | ......... | 360/126 |
| 6,252,741 B1 * | 6/2001 | Ahn | ......... | 360/235.1 |
| 6,359,750 B1 * | 3/2002 | Hughbanks et al. | ......... | 360/128 |
| 6,385,011 B1 * | 5/2002 | Chang et al. | ......... | 360/234.3 |
| 6,445,542 B1 * | 9/2002 | Levi et al. | ......... | 360/236.5 |
| 6,449,126 B1 * | 9/2002 | Dorius et al. | ......... | 360/236.3 |
| 6,466,408 B1 * | 10/2002 | Baumgart et al. | ......... | 360/235.7 |
| 6,487,045 B1 * | 11/2002 | Yanagisawa | ......... | 360/236.5 |
| 6,490,130 B1 * | 12/2002 | Sasaki et al. | ......... | 360/126 |
| 6,587,314 B1 * | 7/2003 | Lille | ......... | 360/313 |
| 2002/0071215 A1 * | 6/2002 | Lewis et al. | ......... | 360/235.7 |
| 2003/0067718 A1 * | 4/2003 | Sasaki et al. | ......... | 360/235.1 |

FOREIGN PATENT DOCUMENTS

EP 0 644 534 A1 3/1995

\* cited by examiner

*Primary Examiner*—Brian E. Miller
(74) *Attorney, Agent, or Firm*—Kinney & Lange, P.A.

(57) ABSTRACT

The present invention is an air bearing slider comprising a transducer for communicating with a disc; a composite slider body with a front portion composed of a first material and a rear portion composed of a second material; an air bearing surface defined on a disc opposing face of the composite slider body, where the air bearing surface comprises the front portion and the rear portion; and a transducer basecoat portion attached to the rear portion of the slider body and containing the transducer. During flight, the mechanical close point of the slider body is at the transducer pole tip.

32 Claims, 8 Drawing Sheets

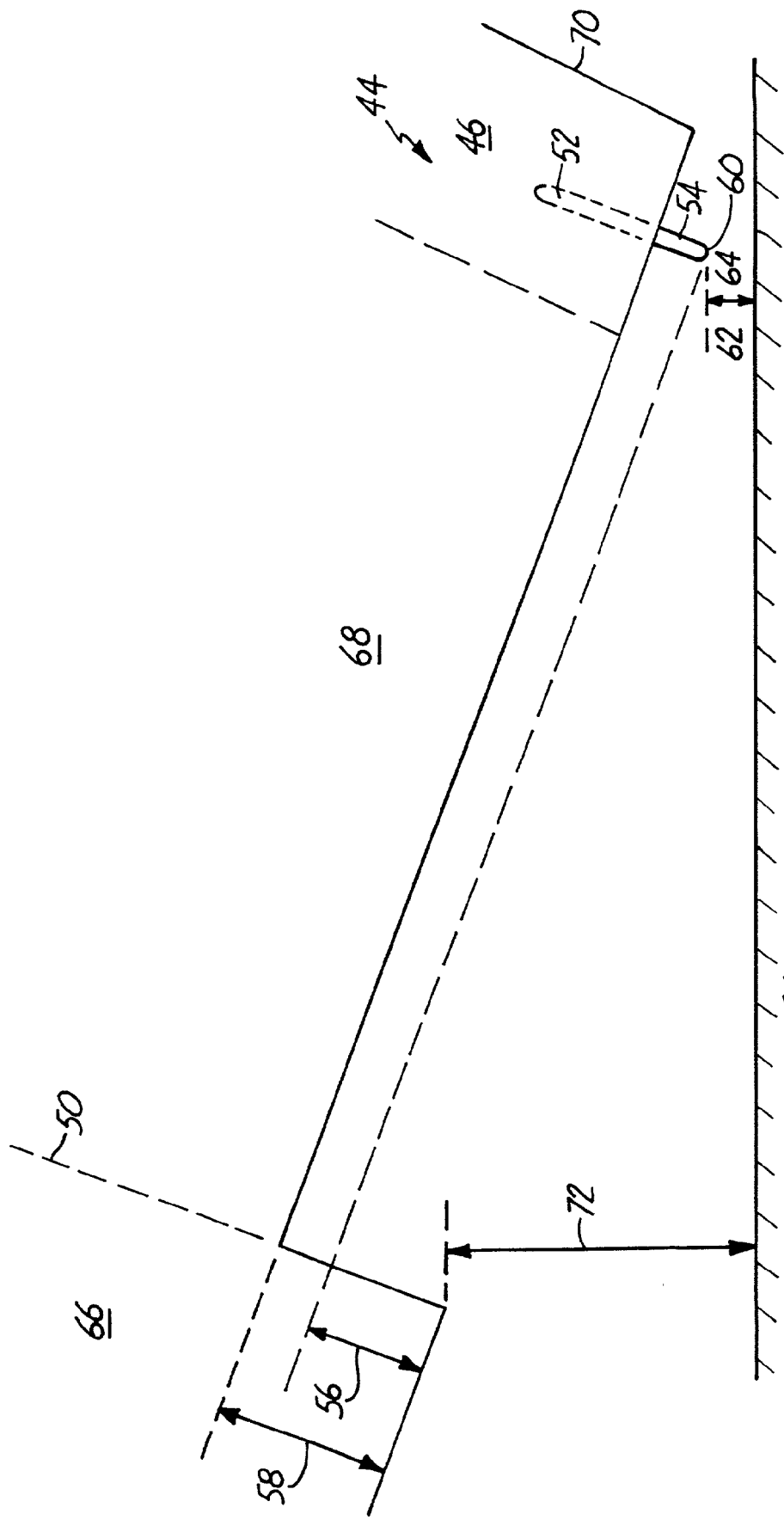

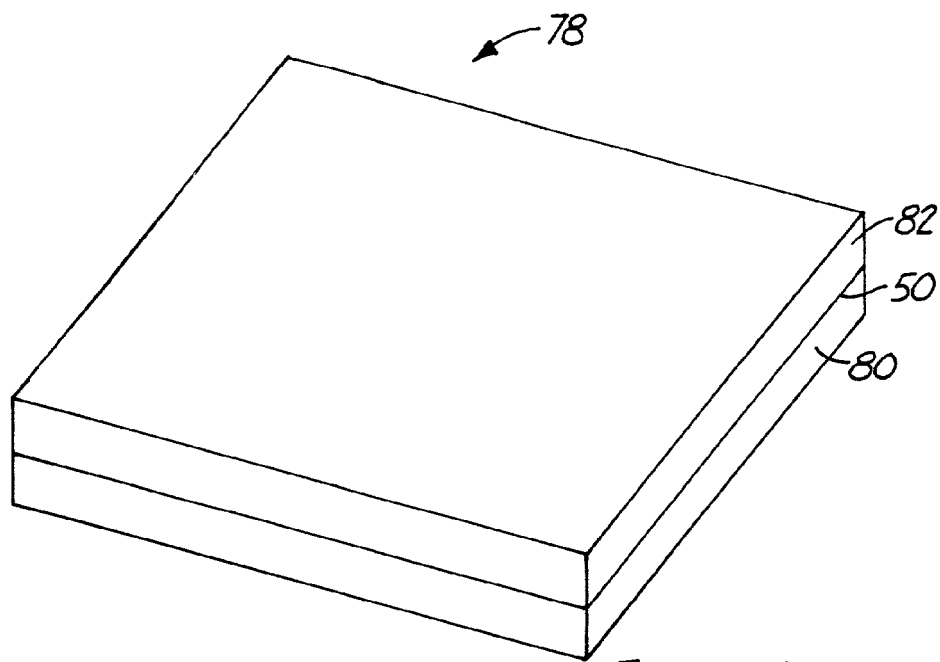
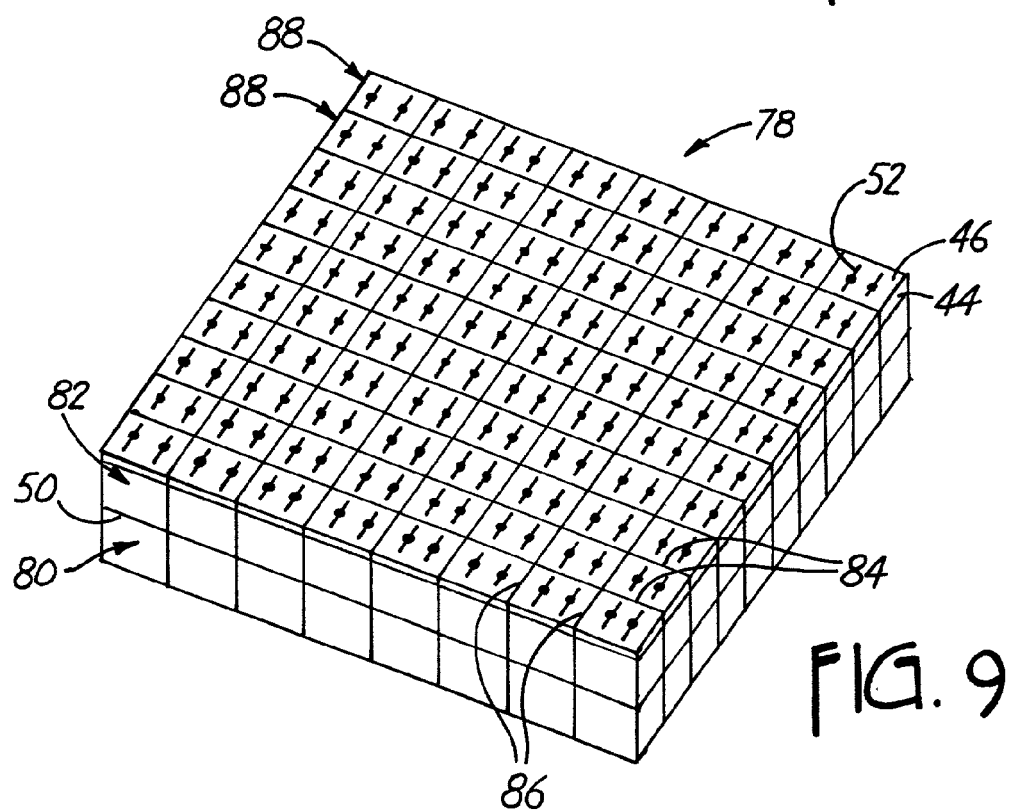

EXTENDED ALUMINA BASECOAT ADVANCED AIR BEARING SLIDER

CROSS REFERENCE TO RELATED APPLICATION

This application claims priority from U.S. Provisional Patent Application Ser. No. 60/239,990, filed on Oct. 13, 2000 for "Extended Alumina Base Coat for Improved Flyability and Alumina Recession Sensitivity" by Zine-Eddine Boutaghou, Jason W. Riddering, and Anthony P. Sannino.

BACKGROUND OF THE INVENTION

The present invention relates to an air bearing slider for use in a data storage device such as a disc drive. More particularly it relates to an air bearing slider capable of operating at ultra-low flying heights.

Air bearing sliders have been extensively used in magnetic disc drives to appropriately position a transducing head above a rotating disc. In a disc drive, each transducer "flies" just a few nanometers above a rotating disc surface. The transducer is mounted in a slider assembly which has a contoured surface. An air bearing force is produced by pressurization of the air as it flows between the disc and slider and is a consequence of the slider contour and relative motion of the two surfaces. The air force prevents unintentional contact between the transducer and the disc. The air bearing also provides a very narrow clearance between the slider transducer and the rotating disc. This allows a high density of magnetic data to be transferred and reduces wear and damage.

In most high capacity storage applications, when the disc is at rest, the air bearing slider is in contact with the disc. During operation, the disc rotates at high speeds, which generates a wind of air immediately adjacent to the flat surface of the disc. This wind acts upon a lower air bearing surface of the slider and generates a lift force directing the slider away from the disc and against a load beam causing the slider to fly at an ultra-low height above the disc.

In negative pressure sliders, the wind also acts upon a portion of the air bearing surface of the slider to generate a suction force. The suction force counteracts the lift force by pulling the slider back toward the surface of the disc. A slider is typically mounted on a gimbal and load beam assembly which biases the slider toward the rotating disc, providing a pre-load force opposite to the lift force acting on the air bearing surface of the slider. For the slider to maintain the ultra-low flying height above the surface of the disc, the lift force must be balanced with the pre-load and suction forces.

As disc storage systems are designed for greater and greater storage capacities, the density of concentric data tracks on discs is increasing (that is, the size of data tracks and radial spacing between data tracks is decreasing), requiring that the air bearing gap between the transducing head carried by the slider and the rotating disc be reduced. One aspect of achieving higher data storage densities in discs is operating the air bearing slider at ultra-low flying heights.

However, shrinking the air bearing gap and operating the slider at ultra-low flying heights has become a source of intermittent contact between the transducing head and the disc. Furthermore, when a disc drive is subjected to a mechanical shock of sufficient amplitude, the slider may overcome the biasing pre-load force of the load beam assembly and further lift away from or off the disc. Damage to the disc may occur when the slider returns to the disc and impacts the disc under the biasing force of the load beam. Such contact can result in catastrophic head-disc interface failure. Damage to the disc may include lost or corrupted data or, in a fatal disc crash, render the disc drive inoperable. Contact resulting in catastrophic failure is more likely to occur in ultra-low flying height systems. Additionally, intermittent contact induces vibrations detrimental to the reading and writing capabilities of the transducing head.

For the disc drive to function properly, the slider must maintain the proper fly height and provide adequate contact stiffness to assure that the slider does not contact the disc during operation. Also, the air bearing slider must have enhanced take-off performance at start up to limit contact between the slider and the disc. Such contact would cause damage to the slider during take-off and landing of the slider.

Air bearing sliders typically possess three primary degrees of movement, which are vertical motion, pitch, and roll rotation. The movement is relative to the gimbal and load beam associated with three applied forces upon the slider defined as pre-load, suction, and lift force. Steady state fly attitude for the slider is achieved when the three applied forces balance each other. A typical air bearing slider has a taper or step at its leading edge to provide for fast pressure buildup during takeoff of the slider from a resting position to a flying altitude above the disc. Air bearing sliders have a trailing edge at which thin film transducers are deposited. Typically, the air bearing surface includes longitudinal rails or pads extending from the leading edge taper toward the trailing edge. The rail design determines the pressure generated by the slider. The pressure distribution underneath the slider determines the flying characteristics, including flying height and pitch and roll of the slider relative to a rotating magnetic disc. Other characteristics that are affected by the configuration of the air bearing surface of a slider are takeoff velocity, air bearing stiffness, and track seek performance.

Flying height is one of the most critical parameters of magnetic recording. As the average flying height of the slider decreases, the transducer achieves greater resolution between the individual data bit locations on the disc. Therefore, it is desirable to have the transducers fly as close to the disc as possible.

In a conventional air bearing slider, the slider body is formed from a substrate wafer of conductive ceramic material. On this substrate, a thin film of insulating material is deposited, and a metallic transducer is built therein, by a process such as sputtering. The transducer, which typically includes a writer portion for storing magnetically-encoded information on a magnetic media and a reader portion for retrieving that magnetically-encoded information from the magnetic media, is formed of multiple layers successively stacked upon the substrate. The volume of the transducer is typically much smaller than the volume of the substrate.

The wafer with transducers formed thereon is then cut into bars, and a cut edge of each bar is lapped to form an air bearing surface. The layers of the transducer, which include both metallic and insulating layers, all have different mechanical and chemical properties than the substrate. These differences in properties affect several aspects of the transducer. First, the different materials of the slider will be lapped at different rates. Because of the difference in hardness or lapping durability of the wafer substrate material, the thin film insulating material, and the transducers, the lapping operation results in differential recession of the materials at the air bearing surface.

Thus, when an air bearing surface of a slider is lapped during its fabrication, differing amounts of the different materials will be removed—resulting in the slider having a uneven air bearing surface. The recession of a particular component is defined as the distance between the air bearing surface of the ceramic substrate and the air bearing surface of that component. Commonly, a greater amount of the metallic layers of the transducer will be removed during the lapping process than will be removed from the slider body substrate. Thus, this lapping process results in a Pole Tip Recession (PTR) of the metallic layers of the transducer with respect to the slider body substrate.

Additionally, the insulating material will often recede at an even greater rate than the transducer, leading to material recession that results in a discernable offset at the interface of the insulating material and the slider body substrate material. The offset prevents the transducer from flying as close to the surface to the magnetic disc as would otherwise be possible.

Further, the differing mechanical and chemical properties of the substrate and transducer layers further affect the air bearing surface during operation of the transducing head. As the magnetic data storage and retrieval system is operated, the transducing head is subjected to increasing temperatures within the magnetic data storage and retrieval system. In addition, a temperature of the transducing head itself, or a part thereof, may be significantly higher than the temperature within the magnetic data storage and retrieval system due to heat dissipation caused by electrical currents in the transducer.

The coefficient of thermal expansion (CTE) is a measure of the change in length for a unit length of material for an incremental change in temperature. The CTE of materials used in forming the substrate is typically much smaller than the CTE of materials used in forming the metallic layers of the transducer. Due to the larger CTE of the transducer's metallic layers, those layers will tend to expand a greater amount than will the substrate. Thus, when the transducing head is subjected to higher operating temperatures, the metallic layers tend to protrude closer to the magnetic disc than the substrate; thereby affecting the PTR of the transducer. This change in PTR caused by temperature is referred to as the Thermal PTR (T-PTR).

During operation of the magnetic data storage and retrieval system, the transducing head is positioned in close proximity to the magnetic media. A distance between the transducer and the media is preferably small enough to allow for writing to and reading from a magnetic medium having a large a real density, and great enough to prevent contact between the magnetic media and the transducer. Performance of the transducer depends primarily on this distance.

Thus, a need exists for an air bearing slider design which achieves a constant, ultra-low transducer flying height, despite the obstacles of differential mechanical and thermal recession. This should be accomplished while minimizing the chance of contact between the transducer and the magnetic disc surface.

BRIEF SUMMARY OF THE INVENTION

The present invention is an air bearing slider comprising a transducer for communicating with a disc; a composite slider body with a front portion composed of a first material and a rear portion composed of a second material; an air bearing surface defined on a disc opposing face of the composite slider body, where the air bearing surface comprises the front portion and the rear portion; and a transducer basecoat portion attached to the rear portion of the slider body and containing the transducer. During flight, the mechanical close point of the slider body is at the transducer pole tip.

BRIEF DESCRIPTION OF THE DRAWINGS

FIG. 6 is an elevation view of a rear portion of the air bearing slider of FIGS. 5A and 5B during flight.

FIG. 8 is a perspective view of a composite wafer of the present invention.

FIG. 9 is a perspective view of the composite wafer of FIG. 8, with transducers formed thereon.

DETAILED DESCRIPTION

Figure 1:
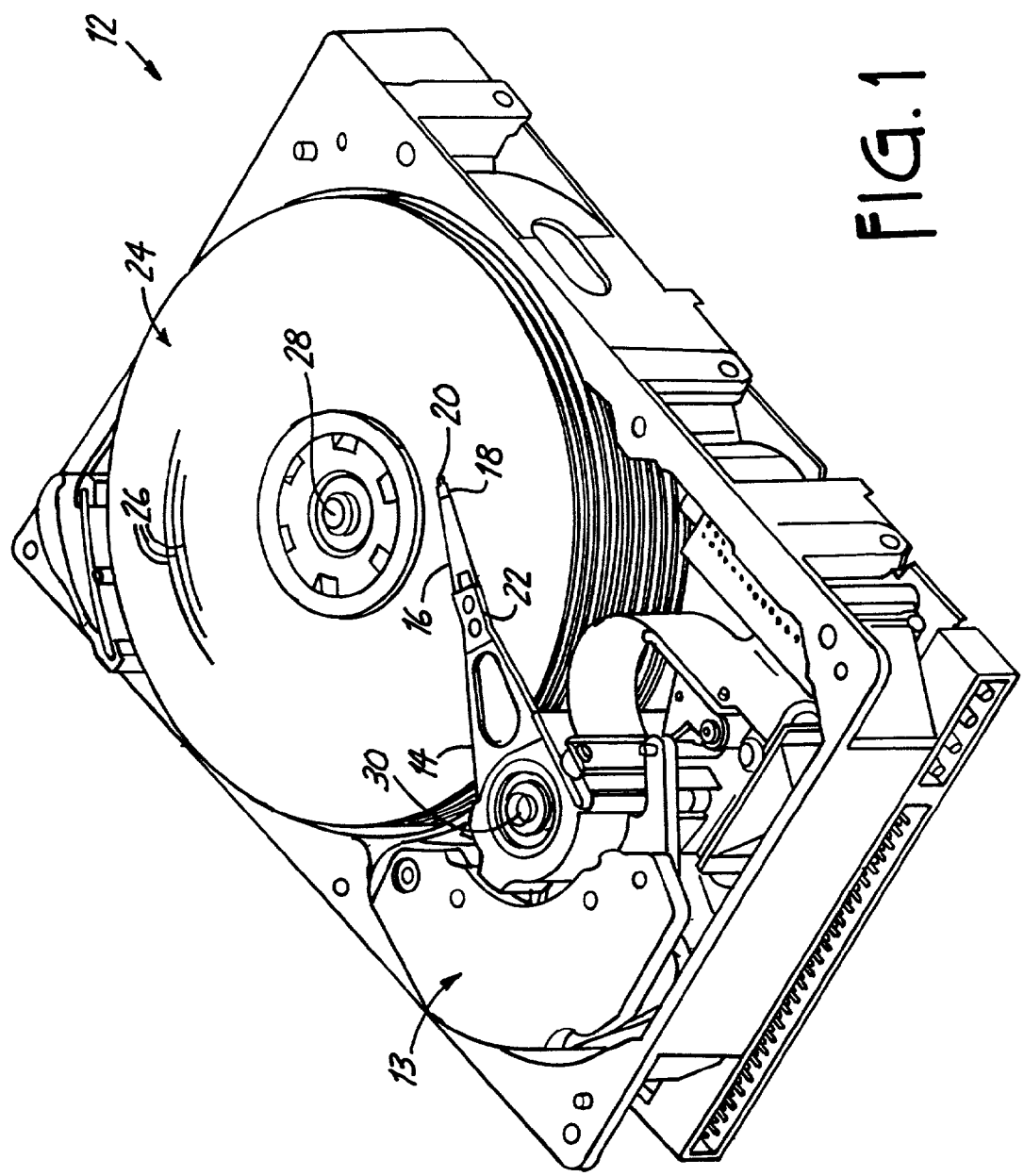
FIG. 1 shows a top perspective view of a disc drive.

FIG. 1 shows a top perspective view of a disc drive 12, which includes a voice coil motor (VCM) 13, actuator arm 14, suspension 16, flexure 18, slider 20, head mounting block 22, and disc 24. Slider 20 is connected to the distal end of suspension 16 by flexure 18. Suspension 16 is connected to actuator arm 14 at head mounting block 22. Actuator arm 14 is coupled to VCM 13. As shown on the right side of FIG. 1, disc 24 has a multiplicity of tracks 26 and rotates about axis 28.

During operation of disc drive 12, rotation of disc 24 generates air movement which is encountered by slider 20. This air movement acts to keep slider 20 aloft a small distance above the surface of disc 24, allowing slider 20 to fly above the surface of disc 24. VCM 13 is selectively operated to move actuator arm 14 around axis 30, thereby moving suspension 16 and positioning the transducing head (not shown) carried by slider 20 over tracks 26 of disc 24. Proper positioning of the transducing head is necessary for reading and writing data on concentric tracks 26 of disc 24.

Figure 2A:
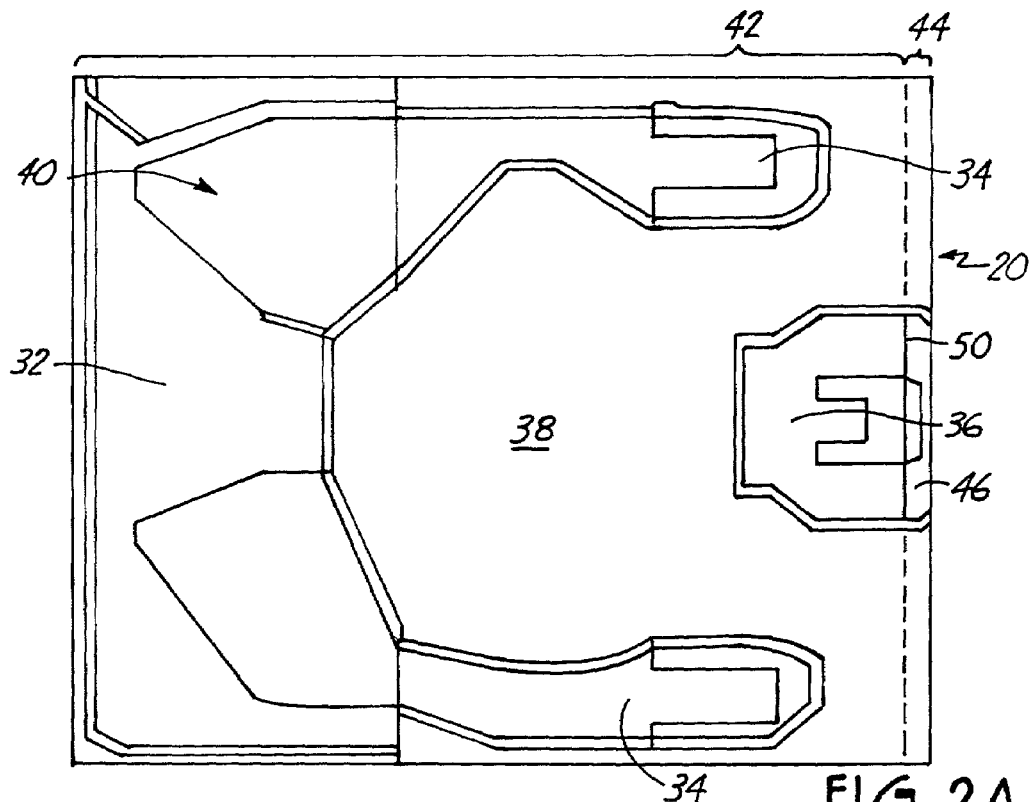
FIG. 2A is a bottom view of an air bearing slider of the prior art.
Figure 2B:
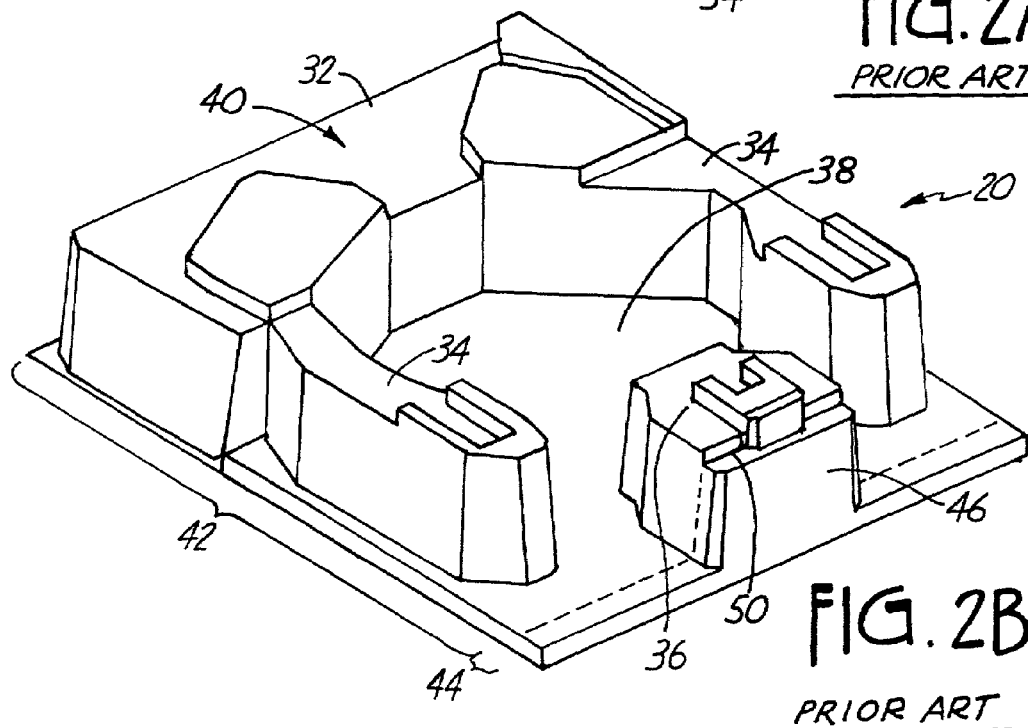
FIG. 2B is a perspective view of the air bearing slider of FIG. 2A.

FIG. 2A is a bottom view of an air bearing slider 20 of the prior art, and FIG. 2B is a bottom perspective view of the air bearing slider of FIG. 2A. In FIG. 2B, the vertical dimension of air bearing surface 40 is greatly exaggerated to more clearly show its features. Slider 20 generally includes cross rail 32, side rails 34, center rail 36, and cavity 38. A direction toward cross rail 32 is designated a forward or leading direction, and a direction toward center rail 36 is designated a rearward or trailing direction. Air bearing surface 40 is generally considered to include cross rail 32, side rails 34, and center rail 36, but not cavity 38.

Slider 20 includes slider body 42, which is composed of a wafer of an electrically-conductive, ceramic substrate material such as $Al_2O_3$—TiC, AlTiC, TiC, Si, SiC, $ZrO_2$ or other composite materials formed of combinations of these materials.

Transducer portion 44 comprises electrical insulating basecoat 46. Interface 50 defines the intersection of the different materials of slider body 42 and transducer portion 44. Basecoat 46 is preferably formed of an insulating material, such as $Al_2O_3$, AlN, $SiO_2$, $Si_3N_4$, SiC, or $SiO_{0-2}N_{0-1.5}$.

Generally, the insulating material for basecoat 46 is selected to closely match the chemical and mechanical properties of the material used for slider body 42. For example, an $Al_2O_3$ basecoat 46 is commonly used in conjunction with an AlTiC slider body 42, since the two materials have similar CTEs. Additionally, $Al_2O_3$ is preferred for basecoat 46 because of the ease of planarization of the material.

Figure 3:
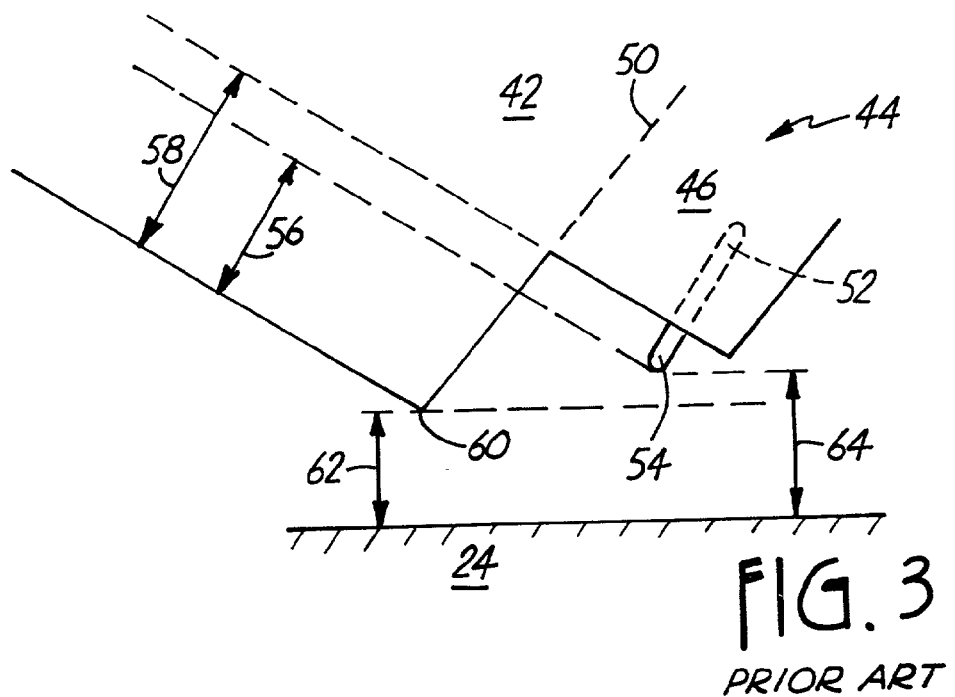
FIG. 3 is an elevation view of a rear portion of the air bearing slider of FIGS. 2A and 2B during flight.

FIG. 3 is an elevation view of a rear portion of the air bearing slider 20 of FIGS. 2A and 2B during flight above magnetic disc 24. FIG. 3 further shows transducer 52 and transducer pole tip 54. Magnetic head transducer 52 with pole tip 54 is formed of electrically conductive metallized patterns embedded within basecoat 46 of transducer portion 48. Such metals typically have large CTEs. Encapsulation of transducer 52 within basecoat 46 is achieved by chemical vapor deposition or another process used in integrated circuit manufacturing.

Generally, the materials which make up slider body 42, basecoat 46, and transducer 52 differ from each other in respect to their hardness or lapping durability. Usually, the material of transducer 52 is softer than the material of slider body 42. Generally, the material of basecoat 46, usually alumina, is softer than the material of transducer 52. These hardness differentials result in varying levels of material recession as the lapping process forms air bearing surface 40 on slider 20 because the softer materials are removed at a higher rate than the harder materials.

Pole tip recession 56 and alumina recession 58 are illustrated in FIG. 3. Because of the pitch at which slider 20 flies, these recessions result in a mechanical close point 60 of slider 20 at interface 50. This pitch is exaggerated in FIG. 3 for purpose of description. Mechanical close point 60 is the point on slider 20 which is the shortest distance from the surface of magnetic disc 24. This distance is the mechanical close point height 62. As can be seen, pole tip fly height 64 is greater than mechanical close point height 62. In most cases, pole tip fly height 64 is up to about eight percent greater than mechanical close point height 62.

Figure 4:
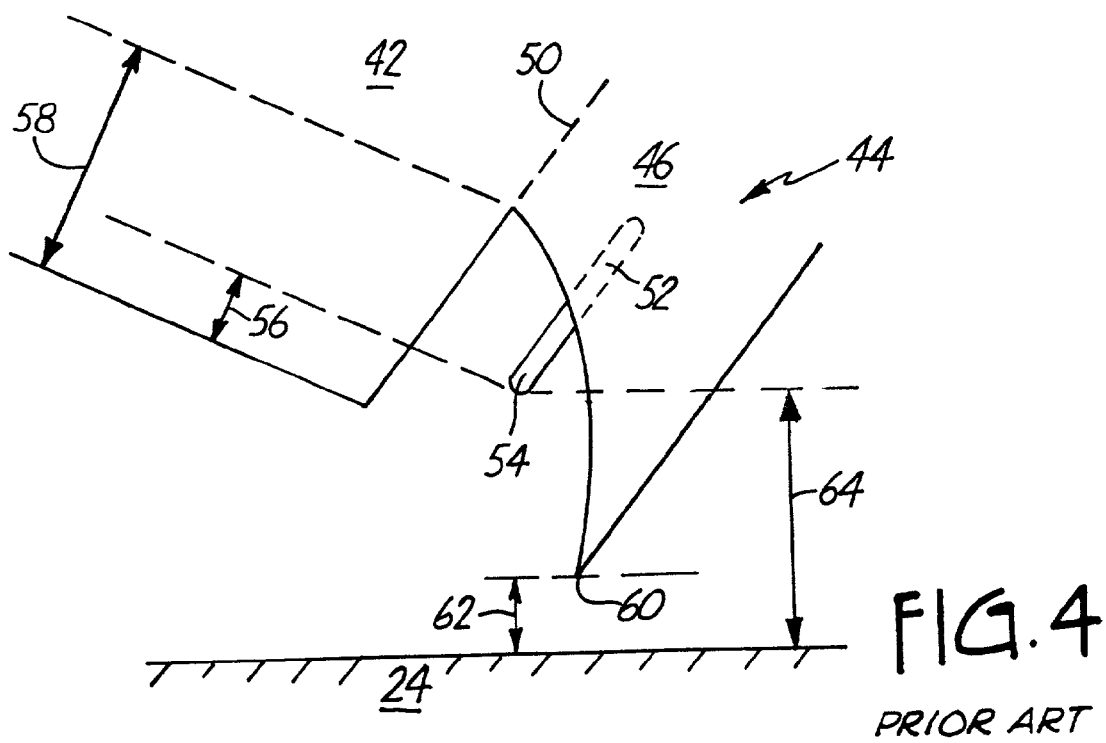
FIG. 4 is an elevation view of a rear portion of an annealed air bearing slider during flight.

One previous attempt at achieving the goal of decreasing pole tip fly height 64 included annealing the material of basecoat 46 to make it stronger, and therefore less susceptible to recession. However, the results were unsuccessful. FIG. 4 is an elevation view of a rear portion of an annealed air bearing slider 20 during flight. As can be seen, an annealing operation results in a "ski jump" effect. The resulting basecoat 46 is shown in FIG. 4. As can be seen, annealing causes the material of basecoat 46 to droop at the trailing end of basecoat 46, so that mechanical close point 60 of slider 20 is at the trailing end of basecoat 46, rather than at pole tip 54. In most instances, pole tip fly height 64 is actually greater after annealing, as shown in FIG. 4, compared with before annealing, as shown in FIG. 3.

Figure 5A:
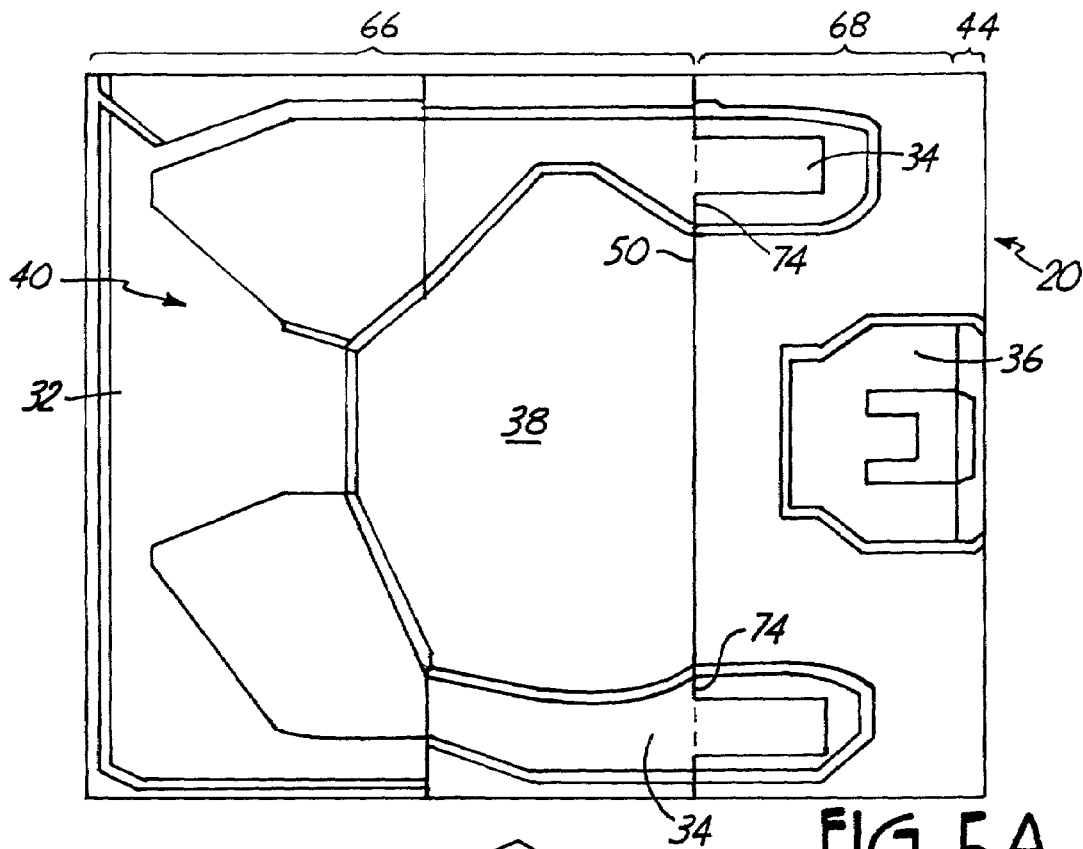
FIG. 5A is a bottom view of a preferred embodiment of the air bearing slider of the present invention.
Figure 5B:
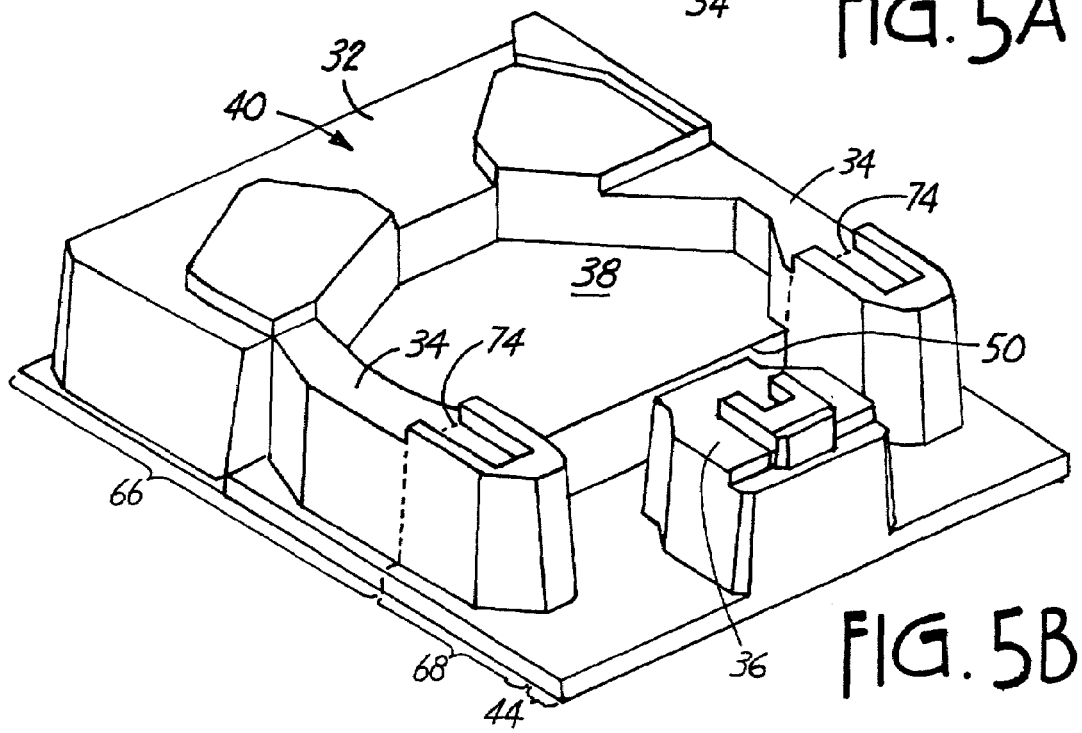
FIG. 5B is a perspective view of the air bearing slider of FIG. 5A.

FIGS. 5A and 5B illustrate an example of a preferred embodiment of the air bearing slider 20 of the present invention. Market demand for increasing hard drive recording density has resulted in a drastic decrease in head media spacing (pole tip fly height 64). Thus, it is preferable that the mechanical close point 60 of slider 20 is at pole tip 54 (as will be discussed later with reference to FIG. 6). In that circumstance, transducer pole tip 54 would be very close to disc 24, thereby resulting in greater recording capacity. An advantage of placing mechanical close point 60 at pole tip 54 is that the configuration improves flyability by decreasing the chance that slider 20 will unintentionally contact disc 24, without a detrimental effect on recording capacity.

FIGS. 5A and 5B illustrate that slider body 42 of slider 20 is composed of a front portion 66 made of first material and a rear portion 68 made of a second material. In FIG. 5B, the vertical dimension of air bearing surface 40 is greatly exaggerated to more clearly show its features. The present invention achieves the goal of placing the mechanical close point 60 of slider 20 at pole tip 54 by moving interface 50 far enough forward on slider 20 that recession differences at interface 50 do not affect pole tip fly height 64.

The present invention also allows slider 20 to compensate for thermal pole tip recession. The CTE of materials used in forming slider body 42 and basecoat 46 is typically much smaller than the CTE of materials used in forming the metallic layers of transducer 52. Due to the larger CTE of the metallic layers, those layers will tend to expand a greater amount than will slider body 42 and basecoat 46. Generally, pole tip 54 expands toward disc 24 with increasing temperature, and retracts away from disc 24 with decreasing temperatures. Because the present invention shifts the mechanical close point 60 to the pole tip 54, any changes in the height of pole tip 54 will be reflected in the fixed head media spacing, and will not affect recording capacity.

Front portion 66 is composed of an electrically-conductive, ceramic substrate material such as $Al_2O_3$—TiC, AlTiC, TiC, Si, SiC, $ZrO_2$ or other composite materials formed of combinations of these materials. The electric conductivity of front portion 66 is important during the manufacture of transducer 52. A significant amount of electrostatic charge builds up during transducer production, and it must be bled away through the conductive material so that it does not result in an electrical short.

Rear portion 68 is composed of an electrical insulating material. Interface 50 defines the intersection of the different materials of front portion 66 and rear portion 68 of slider body 42. Suitable materials for rear portion 68 include, for example, $Al_2O_3$, AlN, $SiO_2$, $Si_3N_4$, SiC, and $SiO_{0-2}N_{0-1.5}$. Generally, the material for rear portion 68 is selected to most closely match the chemical and mechanical properties of the material used for front portion 66. For example, an $Al_2O_3$ rear portion 68 is commonly used in conjunction with an AlTiC front portion 66, since the two materials have similar CTEs.

Transducer portion 44 is formed on rear portion 68, usually of the same material as rear portion 68. In fact, it is because of this unity that rear portion 68 is usually formed of an insulating material. As a practical matter, the insulation properties are important only for basecoat 46 of transducer portion 44, and not important for rear portion 68. Because more than one transducer 52 is typically formed within basecoat 46, the insulating properties of basecoat 46 prevent transducers 52 from shorting each other out during operation. Rear portion 68 is usually made of the same material as basecoat 46 so that there is no mechanical lapping differential between rear portion 68 and transducer portion 44, and thus no recession at the interface. However, rear portion 68 and transducer portion 44 need not be made of the same material if an alternate material is suitable in terms of its mechanical and chemical properties. Transducer 52 with pole tip 54 is formed of electrically conductive metallic materials within basecoat 46 of transducer portion 44. Such metals typically have relatively large CTEs.

Interface 50 is substantially angled with respect to air bearing surface 40. Air bearing surface 40 is formed on the face of slider 20 which opposes disc 24. In a preferred case, interface 50 comprises a latitudinal plane across slider 20 which is substantially orthogonal, or perpendicular, to air bearing surface 40. The present invention may be used on a symmetric or asymmetric, positive or negative pressure air bearing slider. In contrast to FIG. 1 of the prior art, interface 50, as shown in FIGS. 5A and 5B, is positioned much further forward on slider 20. The effect of this placement is shown in FIG. 6.

FIG. 6 is an elevation view of a rear portion of slider 20 of FIGS. 5A and 5B during flight. As shown in FIG. 6, placing interface 50 forward on slider 20 moves mechanical close point 60 from interface 50 to pole tip 54. Thus, transducer 52 is desirably flying as close to disc surface 24 as possible. As can be seen, pole tip recession 56 and alumina recession 58 no longer affect pole tip fly height 64. Therefore, the invention decreases the sensitivity of pole tip fly height 64 to alumina recession 58 and pole tip recession 56.

In practice, the minimum distance of interface 50 from trailing edge 70 of slider 20 will change depending on factors such as the lapping process used, material hardness differentials, recession rates, shape of the air bearing surface, and flight pitch. The significance of the invention is that interface 50 is placed forward enough on slider 20 so that mechanical close point fly height 62 equals pole tip fly height 64, and pole tip fly height 64 is equal to or less than interface fly height 72.

While interface 50 may be placed at or anywhere forward of that minimum distance, the configuration of air bearing surface 40 of an individual slider 20 can influence the selection of position for interface 50.

Referring back to FIGS. 5A and 5B, it is desirable to place interface 50 at a location on air bearing surface 40 where differential lapping between front portion 66 and rear portion 68 will be least disruptive to air flow along surface 40. This location is often where a change in elevation is inherent in the geometry of air bearing surface 40. In this example, interface 50 has been placed at steps 74 of side rails 34.

Moreover, by positioning interface 50 forward of center rail 36, sensitivity of pole tip fly height 64 to alumina recession 58 is greatly reduced. This is because most of the air bearing pressure is generated at center rail 36. If the height of center rail 36 changes due to alumina recession 58, slider 20 will automatically compensate because the recession 58 also affects a significant portion of air bearing surface 40. Therefore, pole tip fly height 64 remains substantially constant with respect to disc 24. In contrast, with a prior art slider 20, such as that of FIGS. 2A and 2B, when alumina recession occurs in transducer portion 44, it results in an uncompensated increase in pole tip fly height 64.

Figure 7A:
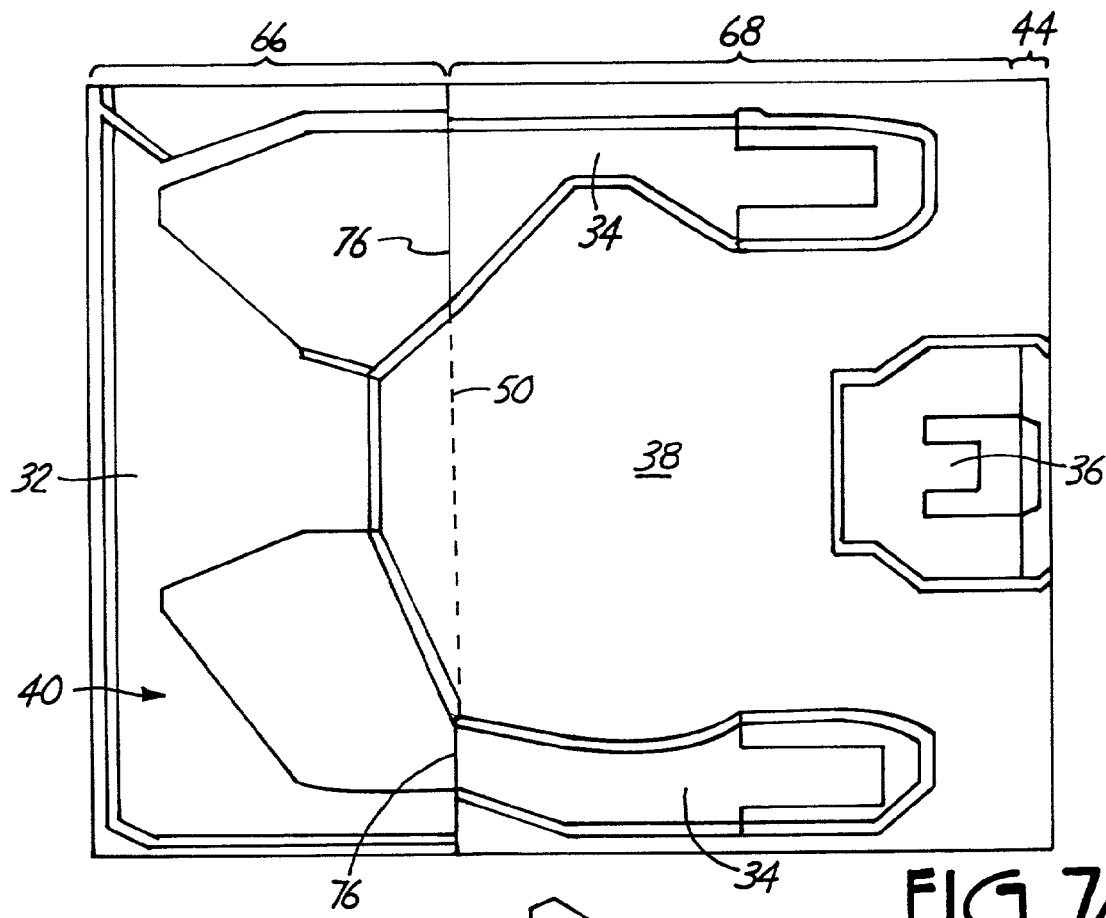
FIG. 7A is a bottom view of a second preferred embodiment of the air bearing slider of the present invention.
Figure 7B:
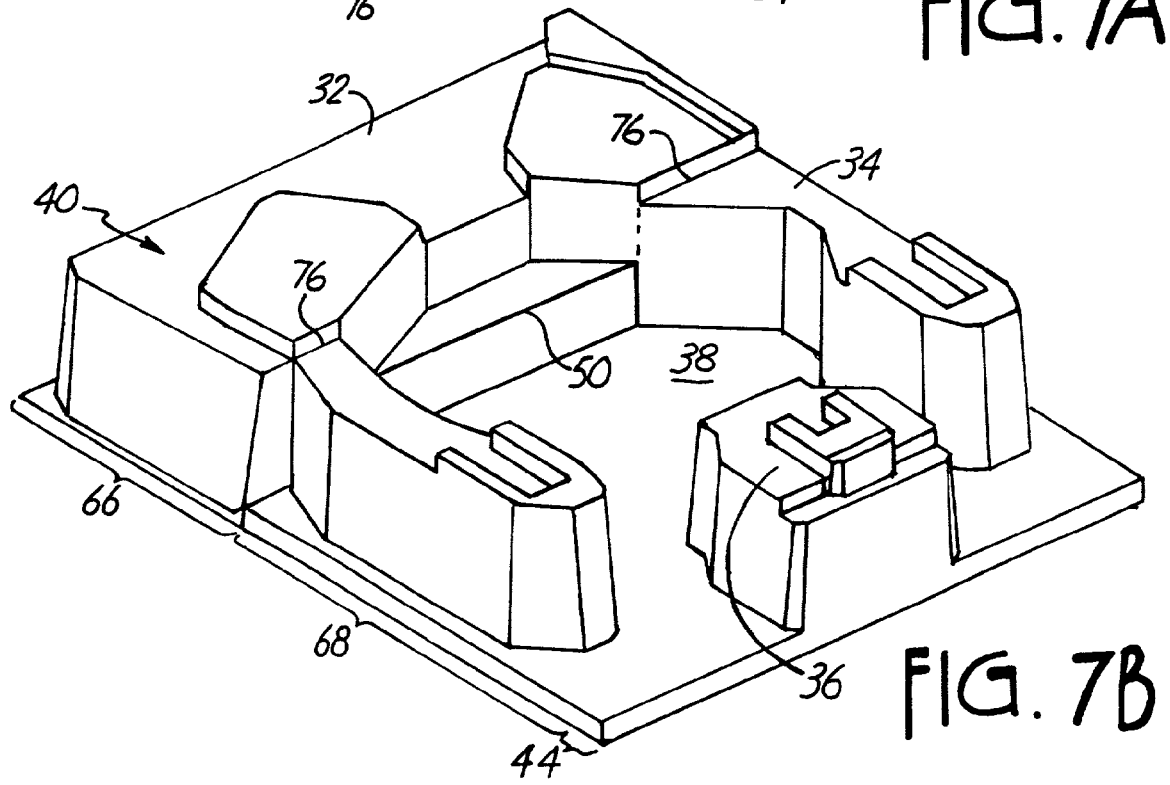
FIG. 7B is a perspective view of the air bearing slider of FIG. 7A.

FIG. 7A is a bottom view of a second preferred embodiment of the air bearing slider 20 of the present invention. FIG. 7B is a perspective view of the air bearing slider of FIG. 7A. In FIG. 7B, the vertical dimension of air bearing surface 40 is greatly exaggerated to more clearly show its features. Following the same reasoning as explained above, in this example, interface 50 has been placed at steps 76 of side rails 34. This is desirable because a change in elevation occurs at step 76 of air bearing surface 40, and any additional change in elevation due to recession at interface 50 is less noticeable at step 76 than it would be at a more level location on air bearing surface 40.

FIG. 8 is a perspective view of composite wafer 78 used to fabricate sliders according to the present invention. In a preferred embodiment, composite wafer 78 is composed of two materials: a conductive ceramic material, and an insulating material. In most air bearing sliders which are about 1250 microns long, the preferable distance between interface 50 and trailing edge 70 is usually between 80 microns and 800 microns. Thus, in a preferred slider body 42, the thickness of the material of front portion 66 may be up to about 15 times the thickness of the material of rear portion 68. Alternatively, the thickness of the material of front portion 66 may be only about half as much as the thickness of the material of rear portion 68.

In a preferred embodiment, ceramic plate or wafer 80 of alumina titanium carbide is adhered to insulating plate or wafer 82 of alumina using an adhesive and pressure. In practice, any pair or plurality of suitable materials can be used, and they can be joined by any known method, such as by bonding, thick film, or other deposition methods.

FIG. 9 is a perspective view of composite wafer 78, after formation of transducer portion 44 thereon, which encapsulates transducers 52. In most cases, transducer portion 44 will be formed on insulating wafer 82 after insulating wafer 82 has been joined with ceramic wafer 80 to form composite wafer 78. However, transducer portion 44 may also be formed on insulating wafer 82 before insulating wafer 82 is joined to ceramic wafer 80. Usually, transducers 52 are formed in transducer portion 44 using a photolithographic process.

In a preferred embodiment, basecoat 46 of transducer portion 44 is the same material which makes up insulating wafer 82. However, the materials themselves may be different as long as their lapping recession rates in a particular application are similar. The present invention would also work if the material of insulating wafer 82 recedes at a greater rate than the material of basecoat 46.

Optionally, a plurality of parallel grooves 84 and a plurality of parallel, orthogonally positioned grooves 86 may be formed on composite wafer 78 to prevent chipping that may occur during cutting of composite wafer 78. Composite wafer 78 is severed along grooves 84 to form slider bars 88.

Figure 10:
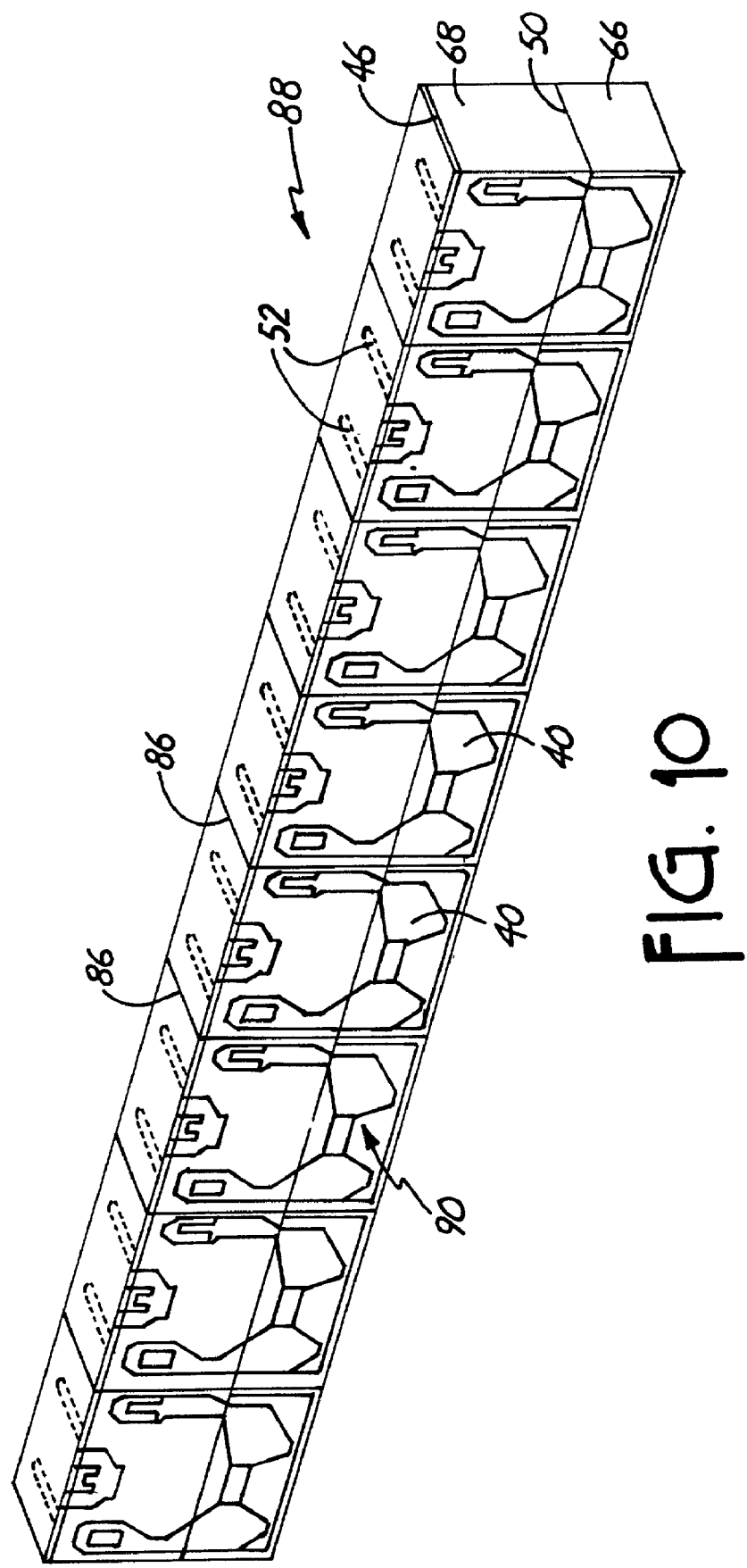
FIG. 10 is a perspective view of a slider bar of FIG. 9.

FIG. 10 is a perspective view of a slider bar 88 of FIG. 9, further showing cut surface 90. Each slider bar 88 is lapped on a cut surface 90 to form air bearing surfaces 40. Further cuts are made along grooves 86 to form individual sliders 20. Front or leading portion 66 of slider 20 is formed from ceramic wafer 80 of FIGS. 8 and 9. Rear or trailing portion 68 is formed from insulating wafer 82 of FIGS. 8 and 9.

While the principles of this invention have been described in connection with specific embodiments, it should be understood clearly that these descriptions are made only by way of example and are not intended to limit the scope of the invention. Workers skilled in the art will recognize that changes may be made in form and detail without departing from the spirit and scope of the invention.

The invention claimed is:

1. An air bearing slider comprising:
   a transducer;
   a composite slider body with a front portion composed of a first material and a rear portion composed of a second material different from the first material, an air bearing surface formed in the front portion and rear portion and having a change in elevation at an interface that separates the front portion and the rear portion; and
   a transducer basecoat portion formed on and integrated with the rear portion of the slider body and containing the transducer.

2. The slider of claim 1 wherein a thickness of the first material is as much as about 15 times a thickness of the second material.

3. The slider of claim 1 wherein a thickness of the first material is as little as about half a thickness of the second material.

4. The slider of claim 1, wherein the transducer basecoat portion comprises the second material.

5. The slider of claim 4, where a lapping durability of the first material is greater than a lapping durability of the second material.

6. The slider of claim 1 wherein the first material and the second material interface at a change in elevation occurring at a single latitudinal plane, the latitudinal plane being substantially perpendicular to an air bearing surface of the slider.

7. The slider of claim 6 wherein the latitudinal plane separates the front portion from the rear portion, wherein the front portion of the slider body is composed entirely of the first material and wherein the rear portion of the slider body is composed entirely of the second material.

8. An air bearing slider comprising:
a transducer for communicating with a disc;
a composite slider body with a front portion composed of a first material and a rear portion composed of a second material different from the first material, the slider body having an air bearing surface defined on a disc opposing face of the slider body, where the air bearing surface comprises the front portion and the rear portion, wherein an interface of the first material and the second material comprises a latitudinal plane with respect to the slider body substantially perpendicular to the air bearing surface, wherein a lapping durability of the first material is greater than a lapping durability of the second material, and where the first material is AlTiC and the second material is $Al_2O_3$; and
a transducer basecoat portion integral with the rear portion of the slider body and containing the transducer, wherein the transducer basecoat portion also comprises the second material.

9. The slider of claim 8 wherein a thickness of the first material is as much as about 15 times a thickness of the second material.

10. The slider of claim 8 wherein a thickness of the first material is as little as about half a thickness of the second material.

11. The slider of claim 8 wherein the front portion of the slider body is composed entirely of the first material and wherein the rear portion of the slider body is composed entirely of the second material.

12. A method of manufacturing a slider body comprising the steps of:
forming a composite wafer comprising a layer of a first material and a layer of a second material different from the first material;
forming on the layer of second material a transducer basecoat portion integral with the layer of second material of the slider body and containing a transducer, wherein the transducer basecoat portion also comprises the second material; and
defining an air bearing surface on the composite wafer, the air bearing surface comprising a leading portion corresponding with the first material and a trailing portion corresponding with the second material positioned behind the leading portion, and having a change in elevation at an interface that separates the layer of first material and the layer of second material.

13. The method of claim 12, where a lapping durability of the first material is greater than a lapping durability of the second material.

14. The method of claim 12 wherein the composite wafer comprises a plurality of joined slider bodies, wherein the transducer basecoat portion contains a plurality of transducers, wherein at least one transducer resides on each of the slider bodies, the method further comprising severing the composite wafer into a plurality of bars.

15. The method of claim 14 further comprising severing a bar into a plurality of individual sliders.

16. The method of claim 12 wherein a thickness of the first material is as much as about 15 times the thickness of the second material.

17. The method of claim 12 wherein a thickness of the first material is as little as about half the thickness of the second material.

18. The method of claim 12 wherein an interface of the first material and the second material comprises a change in elevation occurring at a latitudinal plane which is substantially perpendicular to the air bearing surface.

19. The method of claim 12 wherein the step of forming the composite wafer is performed before the step of forming the transducer basecoat portion.

20. A composite air bearing slider comprising:
a transducer;
a composite slider body comprising:
a front body portion composed of a first material;
a rear body portion composed of a second material different from the first material, the rear body portion being connected to and positioned behind the front body portion;
an air bearing surface corresponding to the front portion and rear portion and having a change in elevation at a first interface that separates the front portion and rear portion; and
a transducer basecoat portion adjacent the rear body portion of the slider body at a second interface and containing the transducer.

21. The slider body of claim 20 wherein a thickness of the first material is as much as about 15 times a thickness of the second material.

22. The slider body of claim 20 wherein a thickness of the first material is as little as about half a thickness of the second material.

23. The slider body of claim 20 in which the transducer basecoat portion also comprises the second material.

24. The slider body of claim 20, wherein a lapping durability of the first material is greater than a lapping durability of the second material.

25. The slider body of claim 20, wherein the first material is AlTiC and the second material is $Al_2O_3$.

26. The slider body of claim 20 wherein the first material and the second material interface at a change in elevation occurring at a single latitudinal plane, the latitudinal plane being substantially perpendicular to an air bearing surface of the slider.

27. The slider body of claim 26 wherein the latitudinal plane separates the front body portion from the rear body portion, wherein the front body portion is composed entirely of the first material and wherein the rear body portion is composed entirely of the second material.

28. An air bearing slider comprising:
a transducer;
a composite slider body including a front portion and a rear portion, wherein:
the front portion comprises AlTiC and
the rear portion comprises $Al_2O_3$;
an air bearing surface corresponding to the front portion and the rear portion and having a change in elevation at a first interface that separates the front portion and the rear portion; and a transducer basecoat portion adjacent to the rear portion of the composite slider body at a second interface, wherein the transducer basecoat portion also comprises $Al_2O_3$.

29. The slider of claim 28 wherein a thickness of the AlTiC is as much as about 15 times a thickness of the $Al_2O_3$ located in the rear portion.

30. The slider of claim 28 wherein a thickness of the AlTiC is as little as about half a thickness of the $Al_2O_3$ located in the rear portion.

31. The slider of claim 28 wherein the AlTiC and the $Al_2O_3$ from the rear portion interface at a change in elevation occurring at a single latitudinal plane, the latitudinal plane being substantially perpendicular to an air bearing surface of the slider.

32. The slider of claim 31 wherein the latitudinal plane separates the front portion from the rear portion, wherein the front portion of the slider body is composed entirely of AlTiC and wherein the rear portion of the slider body is composed entirely of $Al_2O_3$.

* * * * *

UNITED STATES PATENT AND TRADEMARK OFFICE
CERTIFICATE OF CORRECTION

PATENT NO.        : 7,123,448 B1
APPLICATION NO.   : 09/884796
DATED             : October 17, 2006
INVENTOR(S)       : Zine-Eddine Boutaghou et al.

It is certified that error appears in the above-identified patent and that said Letters Patent is hereby corrected as shown below:

Column 3, Line 14, delete the second occurrence of "to", insert --of--

Column 5, Line 36, delete "purpose", insert --purposes--

Signed and Sealed this

Twenty-seventh Day of February, 2007

JON W. DUDAS
*Director of the United States Patent and Trademark Office*